(12) United States Patent
Hirose

(10) Patent No.: US 8,049,967 B2
(45) Date of Patent: Nov. 1, 2011

(54) ANAMORPHIC LENS

(75) Inventor: Masatoshi Hirose, Sakai (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 12/732,165

(22) Filed: Mar. 25, 2010

(65) Prior Publication Data

US 2010/0302647 A1   Dec. 2, 2010

(30) Foreign Application Priority Data

May 27, 2009   (JP) ................... 2009-127485

(51) Int. Cl.
*G02B 13/08* (2006.01)
(52) U.S. Cl. ........................ 359/671; 359/715
(58) Field of Classification Search .......... 359/668, 359/671, 713–715, 754–756, 761–763, 770, 359/771, 781
See application file for complete search history.

(56) References Cited

U.S. PATENT DOCUMENTS 7,280,289 B2 * 10/2007 Yamakawa ............. 359/771
2007/0133107 A1   6/2007 Ohzawa et al.

FOREIGN PATENT DOCUMENTS

| JP | 2006-011093 | 1/2006 |
| JP | 2007-328030 | 12/2007 |
| JP | 2008-276185 | 11/2008 |
| JP | 2008-292800 | 12/2008 |
| WO | WO 2008/062661 | 5/2008 |

* cited by examiner

*Primary Examiner* — Darryl J Collins
(74) *Attorney, Agent, or Firm* — Cozen O'Connor

(57) ABSTRACT

Provided is a low-cost and compact super-wide-angle anamorphic lens having small number of lenses and exhibiting excellent lens performance when the lens is used for an onboard camera, capturing of an unwanted portion is minimized. The super-wide-angle anamorphic lens has an angle of view of 180° or more in the horizontal direction, and includes a first lens having a negative power, a second lens having a negative power, a third lens having a positive power, a fourth lens having a positive power in that order from an object side. One of the aforementioned third lens and fourth lens is provided with at least one non-rotationally symmetric aspherical surface.

8 Claims, 11 Drawing Sheets

S10

S9

S8

S7

S6

S5

S4

S3

S2

S1

0.2mm

S10

S9

S8

S7

S6

S5

S4

S3

S2

S1

0.2mm

S10

S9

S8

S7

S6

S5

S4

S3

S2

S1

0.2mm

S10

S9

S8

S7

S6

S5

S4

S3

S2

S1

0.2mm

S10

S9

S8

S7

S6

S5

S4

S3

S2

S1

0.2mm

ANAMORPHIC LENS

This application is based on Japanese Patent Application No. 2009-127485 filed on May 27, 2009, in Japanese Patent Office, the entire content of which is hereby incorporated by reference.

TECHNICAL FIELD

The present invention relates to a small wide-angle lens system, particularly to a low-cost and compact super-wide-angle anamorphic lens with excellent optical performances suitably for a digital input device using a solid-state image pickup device such as that of an onboard camera.

BACKGROUND

One of the proposals made in recent years is a super-wide-angle lens with an angle of view of 180° or more used for a surveillance camera and onboard camera using a solid-state image pickup device (Japanese Unexamined Patent Application Publication No. 2008-276185 and Japanese Unexamined Patent Application Publication No. 2008-292800).

The super-wide-angle lens system disclosed in the Japanese Unexamined Patent Application Publication No. 2008-276185 has a problem that, when used as the onboard camera or others, the unwanted portions such as sky and ground surface are often captured in the direction of the shorter side of the image pickup device, i.e., in the vertical direction, due to its super-wide angle lens structure.

The lens system disclosed in the Japanese Unexamined Patent Application Publication No. 2008-292800 is made up of six lenses, and an increased size of the lens has been the problem of this system.

SUMMARY

In view of the problems described above, it is an object of the present invention to provide a low-cost and compact super-wide-angle anamorphic lens having small number of lenses and exhibits excellent lens performance when used as an onboard camera, capturing of an unwanted portion is minimized.

In view of forgoing, one embodiment according to one aspect of the present invention is an anamorphic lens having an angle of view of 180° or more in a first direction perpendicular to an optical axis thereof, the lens comprising from an object side:

a first negative lens which is made of glass and has spherical surfaces;

a second negative lens having at least one non-rotationally symmetric aspherical surface;

a third positive lens; and a fourth positive lens, wherein either the third lens or the fourth lens includes at least one non-rotationally symmetric aspherical surface.

According to another aspect of the present invention, another embodiment is an anamorphic lens which is used for forming an image of an object on a rectangular imaging surface of an image pickup device, and has an angle of view of 180° or more in a horizontal direction which is a direction of a long side of the rectangular imaging surface, the anamorphic lens comprising from an object side:

a first negative lens which is made of glass and has spherical surfaces;

a second negative lens having at least one non-rotationally symmetric aspherical surface;

a third positive lens; and a fourth positive lens, wherein either the third lens or the fourth lens includes at least one non-rotationally symmetric aspherical surface.

DETAILED DESCRIPTION OF THE PREFERRED EMBODIMENT

Figure 1A:
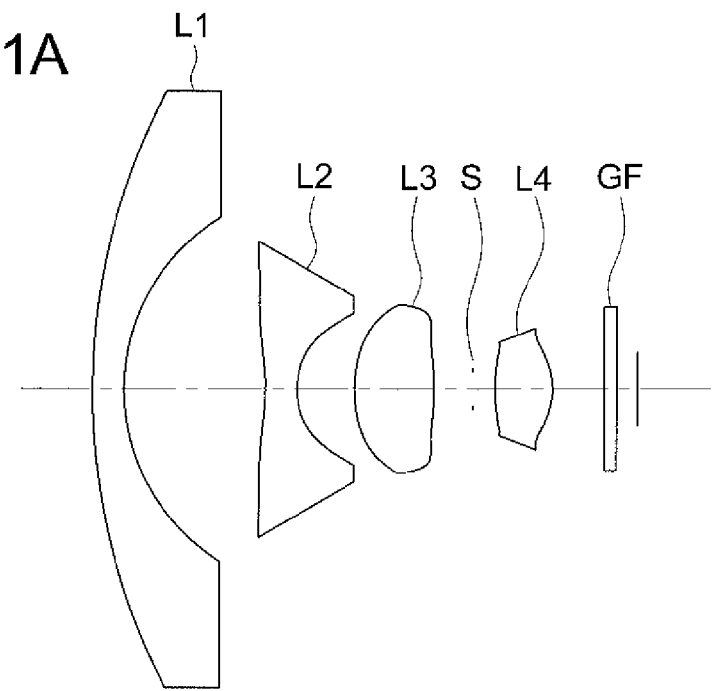
FIGS. 1A and 1B are schematic diagrams of a super-wide-angle anamorphic lens of Example 1.
Figure 1B:
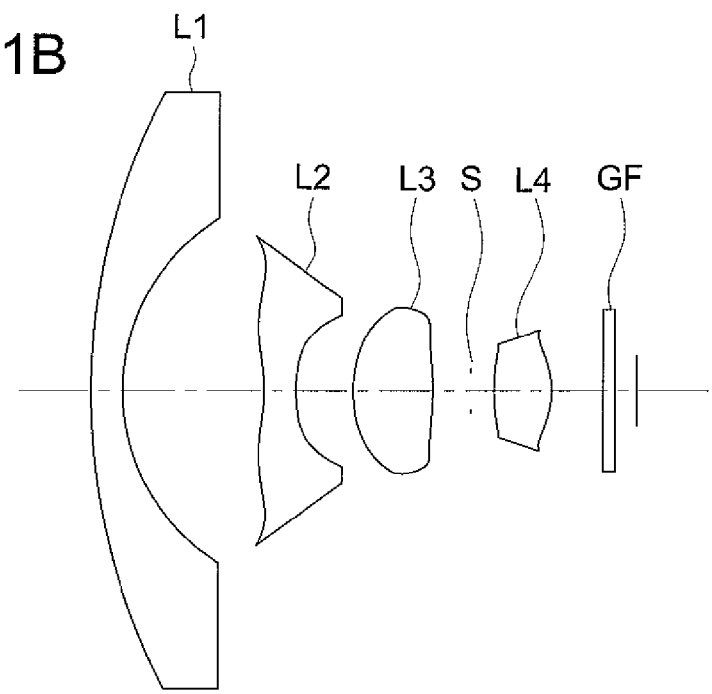
Figure 2A:
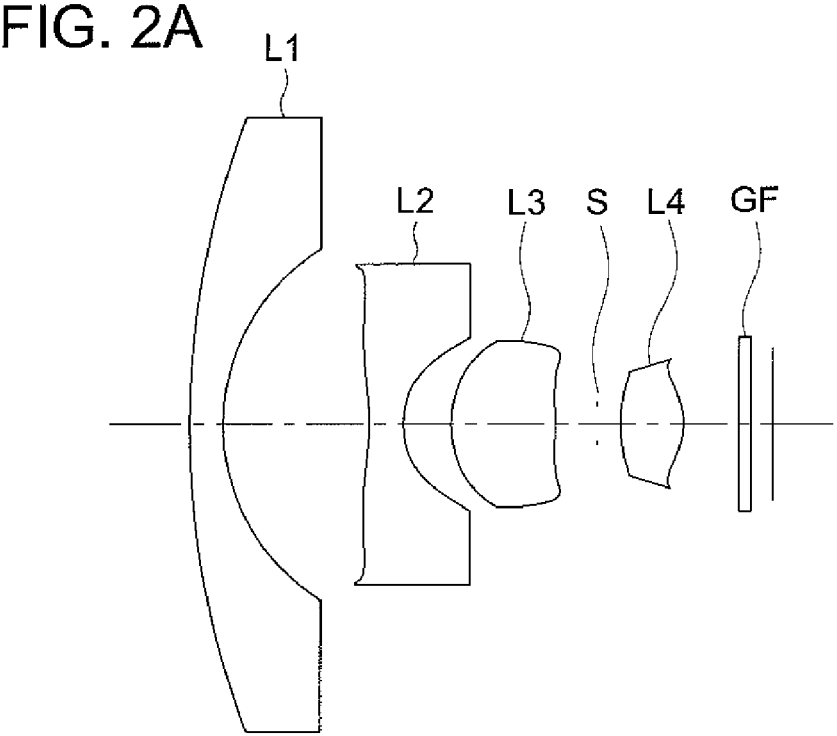
FIGS. 2A and 2B are schematic diagrams of a super-wide-angle anamorphic lens of Example 2.
Figure 2B:
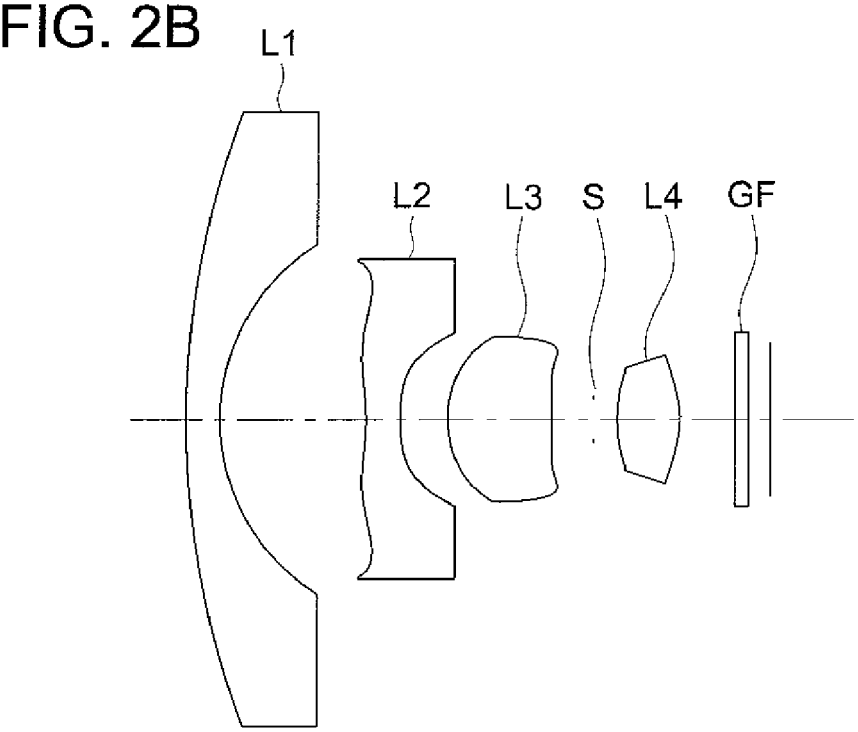
Figure 3A:
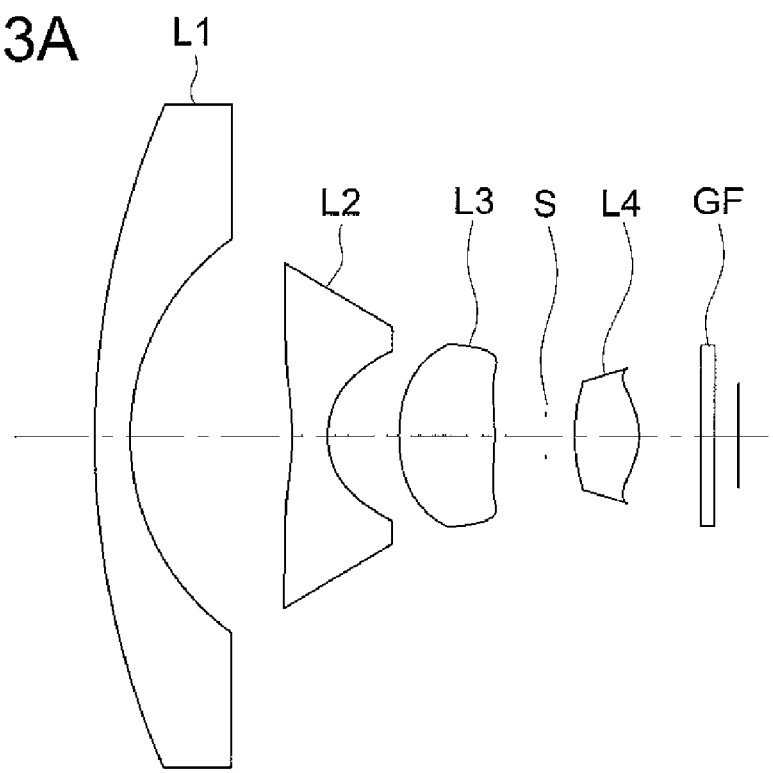
FIGS. 3A and 3B are schematic diagrams of a super-wide-angle anamorphic lens of Example 3.
Figure 3B:
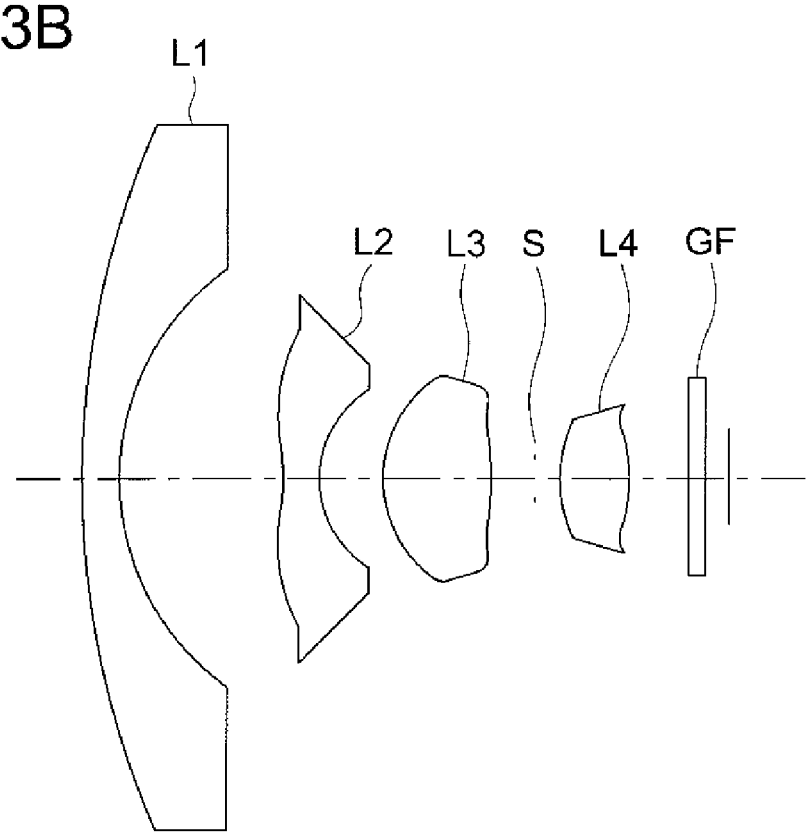
Figure 4A:
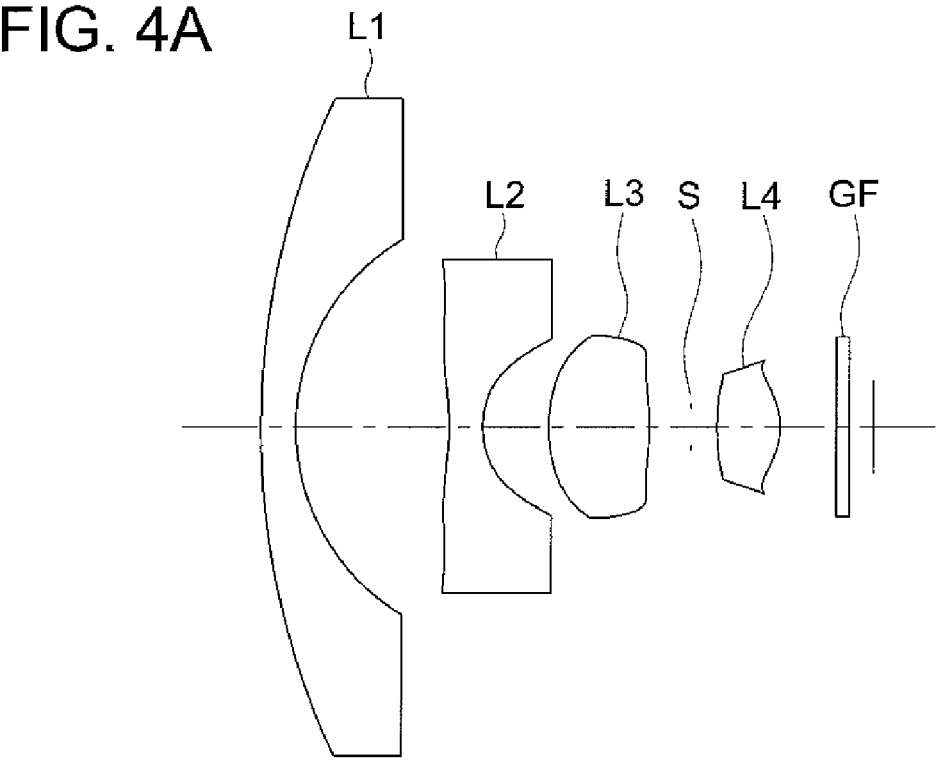
FIGS. 4A and 4B are schematic diagrams of a super-wide-angle anamorphic lens of Example 4.
Figure 4B:
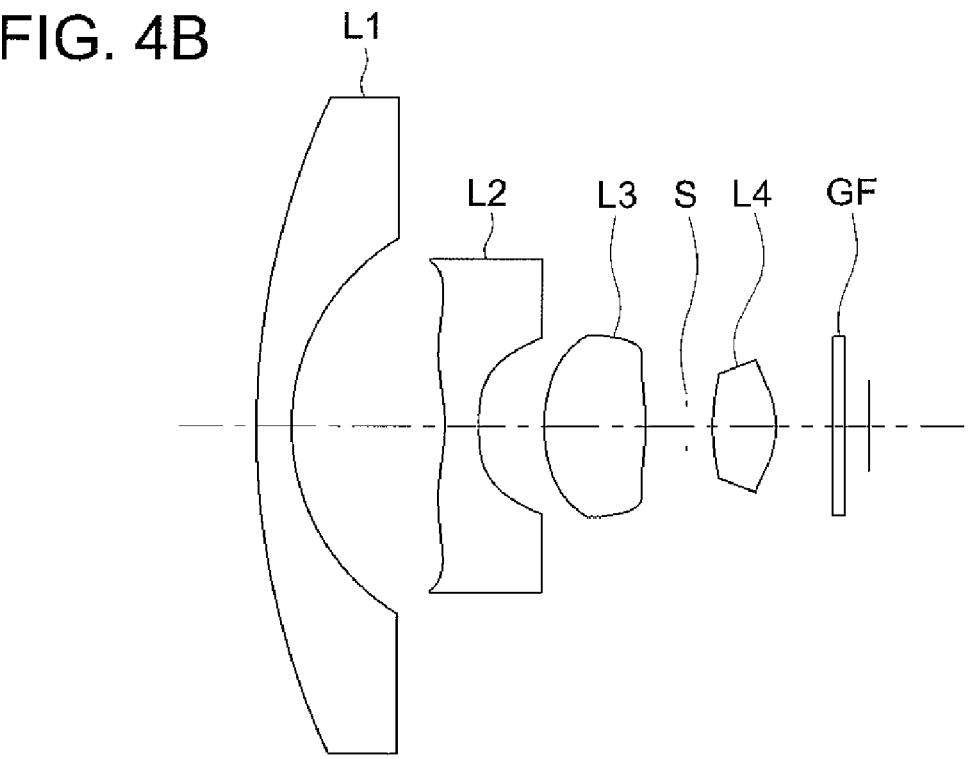
Figure 5A:
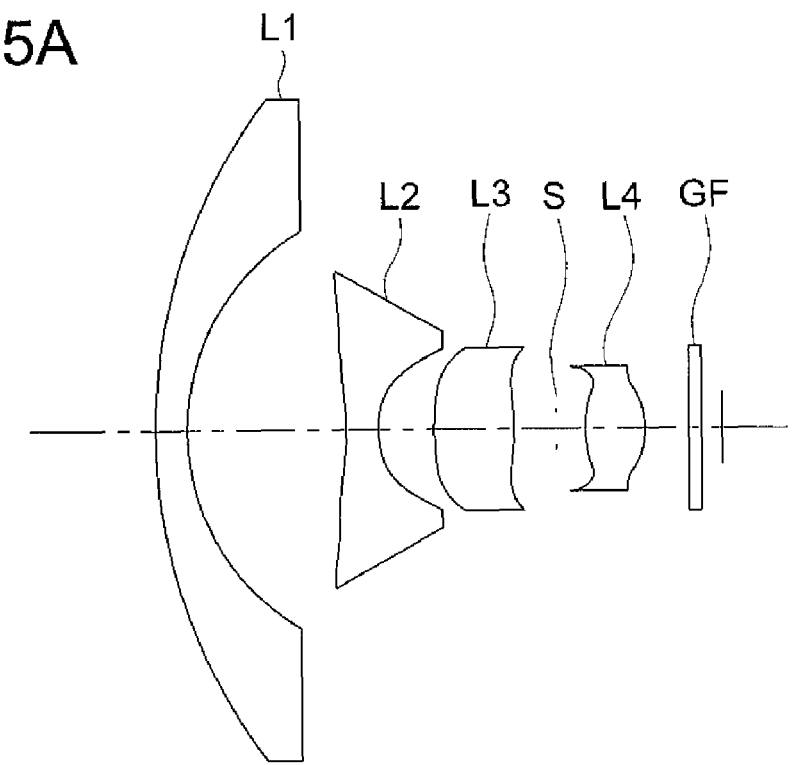
FIGS. 5A and 5B are schematic diagrams of a super-wide-angle anamorphic lens of Example 5.
Figure 5B:
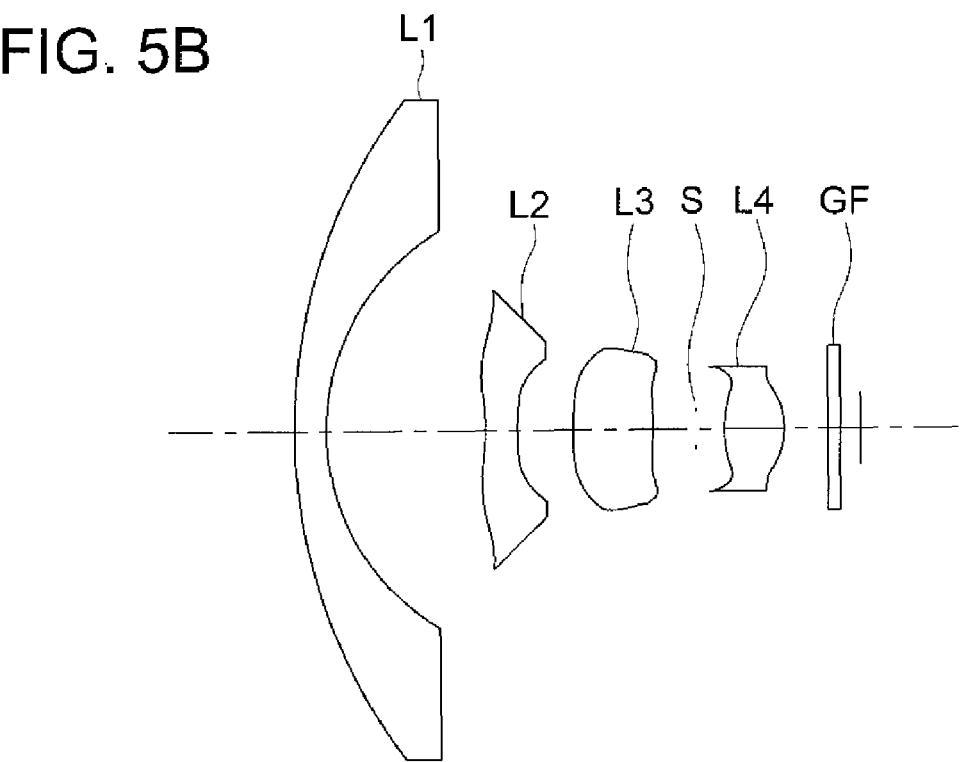

Referring to the drawings, the following describes the preferred embodiments of the present invention:

FIGS. 1A through 5B are the schematic diagrams of super-wide-angle anamorphic lenses of the present invention, corresponding to Example 1 through Example 5, respectively. FIGS. 1A, 2A, 3A, 4A, and 5A are cross sectional views in the horizontal direction, while FIGS. 1B, 2B, 3B, 4B, and 5B are cross sectional views in the vertical direction.

In the present specification, the "power" represents a value defined by a reciprocal of a focal length The super-wide-angle anamorphic lens in FIG. 1A through 5B includes a first lens L1 having a negative power, a second lens L2 having a negative power, a third lens L3 having a positive power, an aperture stop S, a fourth lens L4 having a positive power, and a glass filer GF, in that order when viewed from the object.

To put it in greater details, the first lens L1 is a glass lens with both surfaces being spherical, and the second lens L2 is formed of a plastic lens wherein at least one surface is a non-rotationally symmetric aspherical surface. At least one non-rotationally symmetric aspherical surface is formed on either the third lens L3 or fourth lens L4.

This structure provides an anamorphic lens with excellent performances without an unwanted portion being captured.

Further, when the first lens L1 is a glass spherical lens and used, for example, as an onboard lens, a protective cover or the like is not needed in front of it.

Further, at least one non-rotationally symmetric aspherical surface in the second lens L2 allows the angle of view in the horizontal and vertical directions to be controlled and to be set at a desired value. A plastic lens containing at least one non-rotationally symmetric aspherical surface is provided to the third lens L3 and/or the fourth lens L4. This arrangement corrects the misalignment of focus occuring to the second lens L2 in the horizontal and vertical directions.

The following describes the conditions to be met by the super-wide-angle anamorphic lens in each Example:

In the first place, the angle of view in the horizontal direction is 180° or more.

Formula fx12/fx34 satisfies the following conditional relationship:

$$-0.80 < fx12/fx34 < -0.35 \quad (1)$$

wherein fx12 is a combined focal length of the first lens L1 and second lens L2 in the horizontal direction; fx34 is a combined focal length of the third lens L3 and fourth lens L4 in the horizontal direction. The conditional relationship (1) is used to optimize the total length of the lens, lens back and optical performance. If the formula fx12/fx34 exceeds the lower limit of the conditional relationship (1), enough amount of lens back is provided. If the formula fx12/fx34 exceeds the upper limit of the conditional relationship (1), the lens back get too large and the lens gets bigger. Further, this may lead to deterioration of the curvature of field.

It should be noted that the horizontal direction represent the X direction which is the direction on the longer side of an imaging surface of the image pickup device. The vertical direction represents the Y direction which is a direction of the shorter side of the imaging surface of the image pickup device.

The following conditional formula (2) need to be satisfied:

$$90° \leq 2\omega y \leq 135° \quad (2)$$

wherein 2ωy is the angle of view in the vertical direction. The conditional relationship (2) is employed to optimize the angle of view in the vertical direction. If the conditional relationship (2) cannot be reached, the desired portion cannot be captured. If this formula is exceeded, a large unwanted portion will be captured by the image pickup device. This will further reduce anamorphic advantages.

The super-wide-angle anamorphic lens of the present embodiment as an image pickup lens system, for a solid-state image pickup device, constituted by four lenses minimizes capturing of unwanted portions, and provides a low cost and compact structure having excellent lens performances.

EXAMPLES

Referring to the drawings, the following describes the Examples of the super-wide-angle anamorphic lens according to the present invention.

In the construction data, surfaces marked as aspherical surface (ASP) are defined by the following formula that represents the configuration of the aspherical surface:

$$X(H) = C \cdot H^2 / \{1 + (1 - \epsilon \cdot C^2 \cdot H^2)^{1/2}\} + \Sigma Ai \cdot Hi$$

wherein:
H is the height perpendicular to the optical axis;
X(H) is the amount of displacement (from the surface top) in the direction of the optical axis at height H;
C is a paraxial curvature;
$\epsilon$ is a quadric surface parameter;
Ai is an i-th order aspherical surface coefficient; and
Hi is an i-th power of H.

The surface marked as anamorphic surface (AAS) are defined by the following formula representing the configuration of the non-rotationally symmetric aspherical surface:

$$z = (CX \cdot x^2 + CY \cdot y^2) / [1 +$$
$$\{1 - (1 + KX) \cdot CX^2 \cdot x^2 - (1 + KY) \cdot CY^2 \cdot y^2\}^{1/2}] +$$
$$AR \cdot [(1 - AP) \cdot x^2 + (1 + AP) \cdot y^2]^2 +$$
$$BR \cdot [(1 - BP) \cdot x^2 + (1 + BP) \cdot y^2]^3 +$$
$$CR \cdot [(1 - CP) \cdot x^2 + (1 + CP) \cdot y^2]^4 + DR \cdot [(1 - DP) \cdot x^2 + (1 + DP) \cdot y^2]^5$$

wherein:
z is the amount of displacement (sag from the surface top) in the Z-axis direction at the position of a coordinates (x, y);
CX and CY indicate the curvature (=1/radius of curvature) in the XZ and YZ sections at the surface top, respectively;
KX and KY are unique constants of XZ section and YZ section, respectively;
AR, BR, CR and DR are rotationally symmetric coefficients of deformations of 4th-order, 6th-order, 8th-order, and 10th-order from a circular cone respectively; and
AP, BP, CP and DP are non-rotationally symmetric coefficients of deformations of 4th-order, 6th-order, 8th-order, and 10th-order from a circular cone respectively.

Example 1

The following describes the overall specifications:
f: 0.894 mm (X-direction), 1.244 (Y-direction)
F: 2.8
The following describes the surface data:

| Surface number | | Y radius of curvature | X radius of curvature | Spacing | Refractive index | Distribution |
|---|---|---|---|---|---|---|
| 1 | L1 | 16.464 | — | 0.800 | 1.88300 | 40.99 |
| 2 | L1 | 5.145 | — | 3.604 | | |
| 3 (AAS) | L2 | −3.772 | −5.1485 | 0.800 | 1.53048 | 55.72 |
| 4 (AAS) | L2 | 5.291 | 2.0015 | 1.467 | | |
| 5 (ASP) | L3 | 3.473 | — | 2.018 | 1.63200 | 23.41 |
| 6 (ASP) | L3 | −6.028 | — | 0.973 | | |
| 7 | Stop | ∞ | — | 0.580 | | |
| 8 (ASP) | L4 | 4.871 | — | 1.458 | 1.53048 | 55.72 |
| 9 (AAS) | L4 | −2.167 | −1.6044 | 1.339 | | |
| 10 | CG | ∞ | — | 0300 | 1.52550 | 64.17 |
| 11 | | ∞ | — | 0.500 | | |
| 12 | Image surface | | | | | |

The following describes the AAS surface data:

| | Surface number | | |
|---|---|---|---|
| | 3 | 4 | 9 |
| KY | −0.5563 | 5.8767 | −2.0541 |
| AR | 3.23359E−02 | 2.34938E−02 | −3.01557E−09 |
| BR | −3.55814E−03 | 1.32908E−02 | 1.65168E−06 |
| CR | 2.07973E−04 | −2.75989E−03 | 4.82074E−03 |
| DR | −5.00855E−06 | 7.56389E−05 | 1.43798E−04 |
| KX | 0.5076 | −0.6926 | −2.3176 |
| AP | 1.24310E−01 | 1.04531E−01 | −1.13013E+03 |
| BP | 9.88335E−02 | 2.45036E−02 | 1.23269E+01 |
| CP | 9.34806E−02 | 7.26617E−03 | −9.23373E−02 |
| DP | 1.13389E−01 | −4.39409E−02 | 3.88351E−01 |

The following describes the ASP surface data:

| | Surface number | | |
|---|---|---|---|
| | 5 | 6 | 8 |
| K | 0.8981 | −17.2576 | 0.0000 |
| A1 | −6.69416E−04 | 6.87062E−03 | −9.99425E−04 |
| A2 | 1.79921E−03 | 2.91147E−03 | −5.86726E−02 |
| A3 | 3.88077E−04 | 4.74670E−04 | 1.20083E−01 |
| A4 | −6.28225E−06 | 2.51092E−04 | −6.34146E−02 |
| A5 | −7.83884E−06 | −1.80108E−04 | 0.00000E+00 |

The following describes the values corresponding to the formulas:

$fx12/fx34=-0.498$ b $2\omega y=114.2°$

Figure 6:
FIG. 6 shows spot diagrams of the super-wide-angle anamorphic lens of Example 1.
Figure 6:
Figure 6:
Figure 6:
Figure 6:
Figure 6:
Figure 6:
Figure 6:
Figure 6:
Figure 6:
Figure 6:
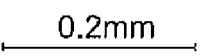
Figure 11:
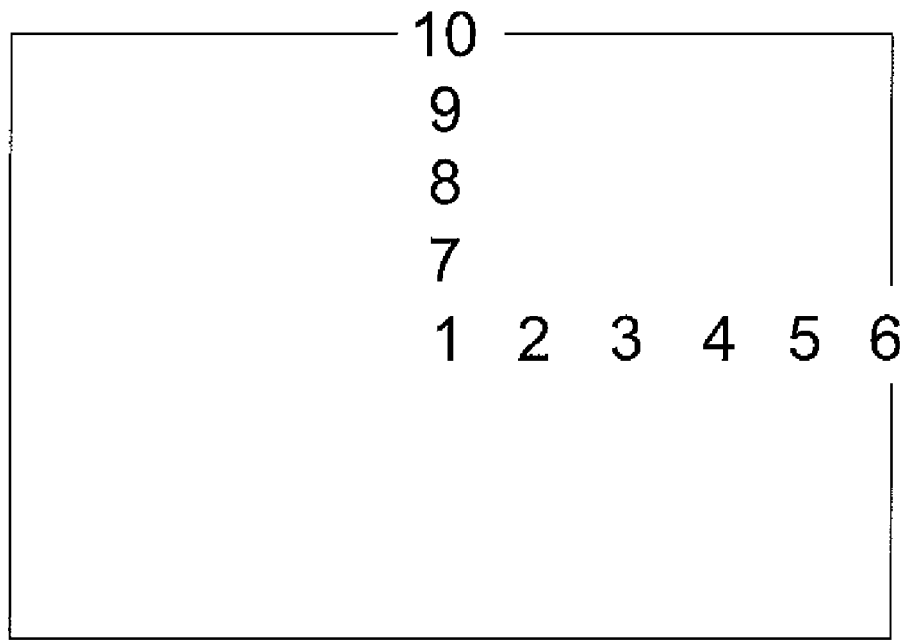
FIG. 11 is a diagram representing the position of the evaluation point.

FIG. 6 shows the spot diagrams S1, S2, S3, S4, S5, S6, S7, S8, S9, and S10 at the evaluation points 1, 2, 3, 4, 5, 6, 7, 8, 9, and 10 of Example 1, respectively. FIG. 11 shows the position of each evaluation point.

Example 2

The following describes the overall specifications:
f: 0.885 mm (X-direction), 1.358 (Y-direction)
F: 2.8
The following describes the surface data:

| Surface number | | Y radius of curvature | X radius of curvature | Spacing | Refractive index | Distribution |
|---|---|---|---|---|---|---|
| 1 | L1 | 20.424 | — | 0.800 | 1.88300 | 40.99 |
| 2 | L1 | 4.905 | — | 3.467 | | |
| 3 (AAS) | L2 | −4.380 | −5.0754 | 0.800 | 1.53048 | 55.72 |
| 4 (AAS) | L2 | 5.762 | 2.0747 | 1.133 | | |
| 5 (ASP) | L3 | 2.723 | — | 2.454 | 1.63200 | 23.41 |
| 6 (ASP) | L3 | −14.289 | — | 0.997 | | |
| 7 | Stop | ∞ | — | 0.565 | | |
| 8 (ASP) | L4 | 3.811 | — | 1.484 | 1.53048 | 55.72 |
| 9 (AAS) | L4 | −2.271 | −1.5444 | 1.329 | | |
| 10 | CG | ∞ | — | 0.300 | 1.52550 | 64.17 |
| 11 | CG | ∞ | — | 0.500 | | |
| 12 | Image surface | | | | | |

The following describes the AAS surface data:

| | Surface number | | |
|---|---|---|---|
| | 3 | 4 | 9 |
| KY | −0.2651 | 6.4516 | −4.4230 |
| AR | 3.25615E−02 | 2.37774E−02 | −1.04352E−09 |
| BR | −3.49922E−03 | 1.22973E−02 | 5.11842E−07 |
| CR | 2.01802E−04 | −2.74017E−03 | 6.83300E−03 |
| DR | −4.59923E−06 | 4.29457E−05 | −2.80140E−06 |
| KX | 0.7623 | −0.5752 | −2.9048 |
| AP | 1.13847E−01 | 1.64547E−01 | −1.98555E+03 |
| BP | 9.96449E−02 | 2.98113E−02 | 2.04237E+01 |
| CP | 8.87126E−02 | 3.93205E−02 | −1.19990E−01 |
| DP | 1.16625E−01 | 1.37833E−01 | 2.66487E+00 |

The following describes the ASP surface data:

| | Surface number | | |
|---|---|---|---|
| | 5 | 6 | 8 |
| K | −0.4233 | −45.0628 | 0.0000 |
| A1 | 9.59835E−03 | 2.66452E−02 | 1.19622E−02 |
| A2 | 1.57182E−03 | 4.66365E−03 | −5.19800E−02 |
| A3 | 3.36003E−04 | 1.18103E−03 | 9.30393E−02 |
| A4 | 3.67409E−05 | 1.26530E−03 | −4.39054E−02 |
| A5 | −9.00242E−06 | −8.20997E−04 | 0.00000E+00 |

The following describes the values corresponding to the formulas:

$fx12/fx34=-0.405$ $2\omega y=105.3°$

Figure 7:
FIG. 7 shows spot diagrams of the super-wide-angle anamorphic lens of Example 2.
Figure 7:
Figure 7:
Figure 7:
Figure 7:
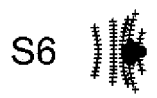
Figure 7:
Figure 7:
Figure 7:
Figure 7:
Figure 7:

FIG. 7 shows the spot diagrams S1, S2, 53, S4, S5, S6, S7, S8, S9, and 810 at the evaluation points 1, 2, 3, 4, 5, 6, 7, 8, 9, and 10 of Example 2, respectively. FIG. 11 shows the position of each evaluation point.

Example 3

The following describes the overall specifications:
f: 0.889 mm (X-direction), 1.376 (Y-direction)
F: 2.8
The following describes the surface data:

| Surface number | | Y radius of curvature | X radius of curvature | Spacing | Refractive index | Distribution |
|---|---|---|---|---|---|---|
| 1 | L1 | 18.876 | — | 0.800 | 1.88300 | 40.99 |
| 2 | L1 | 5.529 | — | 3.458 | | |
| 3 (AAS) | L2 | −4.688 | −5.0826 | 0.800 | 1.53048 | 55.72 |
| 4 (AAS) | L2 | 5.238 | 1.9446 | 1.398 | | |
| 5 (ASP) | L3 | 3.275 | — | 2.179 | 1.63200 | 23.41 |
| 6 (ASP) | L3 | −7.785 | — | 1.022 | | |
| 7 | Stop | ∞ | — | 0.576 | | |
| 8 (ASP) | L4 | 4.202 | — | 1.467 | 1.53048 | 55.72 |
| 9 (AAS) | L4 | −2.315 | −1.5795 | 1.332 | | |
| 10 | CG | ∞ | — | 0.300 | 1.52550 | 64.17 |
| 11 | CG | ∞ | — | 0.500 | | |
| 12 | Image surface | | | | | |

The following describes the AAS surface data:

| | Surface number | | |
|---|---|---|---|
| | 3 | 4 | 9 |
| KY | 0.3202 | 6.2968 | −5.6782 |
| AR | 3.27486E−02 | 1.77863E−02 | −1.29422E−08 |
| BR | −3.53310E−03 | 1.30919E−02 | 2.00762E−06 |
| CR | 2.09502E−04 | −2.78898E−03 | 6.17607E−03 |
| DR | −4.97098E−06 | 6.16216E−05 | 1.22144E−03 |
| KX | 0.5462 | −0.6570 | −2.5007 |
| AP | 1.34612E−01 | 1.38020E−01 | −4.73378E+02 |
| BP | 1.02707E−01 | 7.87749E−03 | 1.41622E+01 |
| CP | 9.25191E−02 | 1.72893E−02 | −1.33233E−01 |
| DP | 1.04654E−01 | −1.38893E−03 | 5.23389E−02 |

The following describes the ASP surface data:

| | Surface number | | |
|---|---|---|---|
| | 5 | 6 | 8 |
| K | 0.7989 | −25.1917 | 0.0000 |
| A1 | 7.11809E−04 | 1.25232E−02 | 1.07424E−02 |
| A2 | 1.80067E−03 | 6.63945E−03 | −5.87009E−02 |
| A3 | 4.08395E−04 | 9.96173E−04 | 1.05559E−01 |
| A4 | −4.62927E−06 | 2.97866E−04 | −4.80929E−02 |
| A5 | −6.07015E−06 | −3.48871E−04 | 0.00000E+00 |

The following describes the values corresponding to the formulas:

$fx12/fx34 = -0.477$ $2\omega y = 95.6°$

Figure 8:
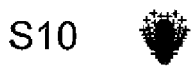
FIG. 8 shows spot diagrams of the super-wide-angle anamorphic lens of Example 3.
Figure 8:
Figure 8:
Figure 8:
Figure 8:
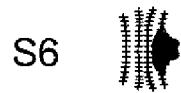
Figure 8:
Figure 8:
Figure 8:
Figure 8:
Figure 8:

FIG. 8 shows the spot diagrams S1, S2, S3, S4, S5, S6, S7, S8, S9, and S10 at the evaluation points 1, 2, 3, 4, 5, 6, 7, 8, 9, and 10 of Example 3, respectively. FIG. 11 shows the position of each evaluation point.

Example 4

The following describes the overall specifications:
f: 0.897 mm (X-direction), 1.184 (Y-direction)
F: 2.8
The following describes the surface data:

| Surface number | | Y radius of curvature | X radius of curvature | Spacing | Refractive index | Distribution |
|---|---|---|---|---|---|---|
| 1 | L1 | 18.013 | — | 0.800 | 1.88300 | 40.99 |
| 2 | L1 | 5.105 | — | 3.574 | | |
| 3 (AAS) | L2 | −3.812 | −5.3990 | 0.782 | 1.53048 | 55.72 |
| 4 (AAS) | L2 | 5.291 | 2.1503 | 1.530 | | |
| 5 (ASP) | L3 | 3.657 | — | 2.351 | 1.63200 | 23.41 |
| 6 (ASP) | L3 | −5.673 | — | 0.962 | | |
| 7 | Stop | ∞ | — | 0.603 | | |
| 8 (ASP) | L4 | 5.118 | — | 1.462 | 1.53048 | 55.72 |
| 9 (AAS) | L4 | −2.091 | −1.6495 | 1.335 | | |
| 10 | CG | ∞ | — | 0.300 | 1.52550 | 64.17 |
| 11 | CG | ∞ | — | 0.500 | | |
| 12 | Image surface | | | | | |

The following describes the AAS surface data:

| | Surface number | | |
|---|---|---|---|
| | 3 | 4 | 9 |
| KY | −0.4271 | 5.3623 | −0.9995 |
| AR | 3.19124E−02 | 2.53121E−02 | −1.72254E−09 |
| BR | −3.58597E−03 | 1.35493E−02 | −6.61578E−07 |

-continued

| | Surface number | | |
|---|---|---|---|
| | 3 | 4 | 9 |
| CR | 2.07543E-04 | -2.87881E-03 | 6.50075E-03 |
| DR | -4.85217E-06 | 7.50552E-05 | 1.82829E-05 |
| KX | 0.3916 | -0.7267 | -1.4000 |
| AP | 1.19039E-01 | 1.44536E-01 | -1.26481E+03 |
| BP | 9.96096E-02 | 3.22441E-02 | 8.00968E+00 |
| CP | 9.57837E-02 | 1.89816E-02 | -1.12148E-01 |
| DP | 1.04476E-01 | -7.01281E-02 | 8.75480E-02 |

The following describes the ASP surface data:

| | Surface number | | |
|---|---|---|---|
| | 5 | 6 | 8 |
| K | 1.0923 | -15.4404 | 0.0000 |
| A1 | -2.29057E-04 | 8.65239E-03 | -4.42387E-03 |
| A2 | 1.64168E-03 | 3.48047E-03 | -6.45804E-02 |
| A3 | 3.24556E-04 | 9.22530E-04 | 1.15013E-01 |
| A4 | -7.80437E-06 | 2.23599E-04 | -4.87627E-02 |
| A5 | -7.64473E-06 | -2.45255E-04 | 0.00000E+00 |

The following describes the values corresponding to the formulas:

$fx12/fx34 = -0.493$ $2\omega y = 129°$

Figure 9:
FIG. 9 shows spot diagrams of the super-wide-angle anamorphic lens of Example 4.
Figure 9:
Figure 9:
Figure 9:
Figure 9:
Figure 9:
Figure 9:
Figure 9:
Figure 9:
Figure 9:

FIG. 9 shows the spot diagrams S1, S2, S3, S4, S5, 56, S7, 58, S9, and S10 at the evaluation points 1, 2, 3, 4, 5, 6, 7, 8, 9, and 10 of Example 4, respectively. FIG. 11 shows the position of each evaluation point.

Example 5

The following describes the overall specifications:
f: 0.889 mm (X-direction), 1.090 (Y-direction)
F: 2.8
The following describes the surface data:

| Surface number | | Y radius of curvature | X radius of curvature | Spacing | Refractive index | Distribution |
|---|---|---|---|---|---|---|
| 1 | L1 | 13.831 | — | 0.800 | 1.88300 | 40.99 |
| 2 | L1 | 5.832 | — | 4.006 | | |
| 3 (AAS) | L2 | -4.655 | -5.2392 | 0.800 | 1.53048 | 55.72 |
| 4 (AAS) | L2 | 8.679 | 2.5413 | 1.395 | | |
| 5 (ASP) | L3 | 8.888 | — | 2.011 | 1.63200 | 23.41 |
| 6 (ASP) | L3 | -7.679 | -4.7672 | 1.075 | | |
| 7 | Stop | ∞ | — | 0.537 | | |
| 8 (ASP) | L4 | 3.841 | — | 1.469 | 1.53048 | 55.72 |
| 9 (AAS) | L4 | -1.546 | — | 1.327 | | |
| 10 | CG | ∞ | — | 0.300 | 1.52550 | 64.17 |
| 11 | CG | ∞ | — | 0.500 | | |
| 12 | Image surface | | | | | |

The following describes the AAS surface data:

| | Surface number | | |
|---|---|---|---|
| | 3 | 4 | 6 |
| KY | 0.1801 | 17.1672 | -34.0603 |
| AR | 3.20002E-02 | 2.77317E-02 | 2.97326E-02 |
| BR | -3.49864E-03 | 1.33204E-02 | 3.56388E-03 |
| CR | 1.96694E-04 | -1.92605E-03 | 6.72755E-04 |
| DR | -4.10978E-06 | -5.53166E-05 | -5.38284E-04 |
| KX | 0.8342 | -0.8237 | 2.5883 |
| AP | 1.37487E-01 | 5.37835E-02 | -1.02351E-01 |
| BP | 1.02097E-01 | -1.72304E-01 | 6.31736E-01 |
| CP | 8.89248E-02 | 6.78484E-02 | -9.49645E-02 |
| DP | 1.16655E-01 | -2.76747E-01 | 2.82253E-01 |

The following describes the ASP surface data:

| | Surface number | | |
|---|---|---|---|
| | 5 | 8 | 9 |
| K | 11.1669 | 0.0000 | -1.7327 |
| A1 | 1.68445E-02 | -1.47886E-02 | -1.23974E-03 |
| A2 | 2.28299E-03 | -2.22380E-02 | 6.17933E-03 |
| A3 | 2.80033E-04 | 5.58483E-02 | 8.70962E-03 |
| A4 | -5.59305E-05 | -2.86024E-02 | -5.14093E-03 |
| A5 | 5.46074E-06 | 0.00000E+00 | 1.43961E-03 |

The following describes the values corresponding to the formulas:

$fx12/fx34 = -0.764$ $2\omega y = 111.1°$

Figure 10:
FIG. 10 shows spot diagrams of the super-wide-angle anamorphic lens of Example 5.
Figure 10:
Figure 10:
Figure 10:
Figure 10:
Figure 10:
Figure 10:
Figure 10:
Figure 10:
Figure 10:

FIG. 10 shows the spot diagrams S1, S2, S3, S4, S5, S6, S7, S8, S9, and S10 at the evaluation points 1, 2, 3, 4, 5, 6, 7, 8, 9, and 10 of Example 5, respectively. FIG. 11 shows the position of each evaluation point.

What is claimed is:

1. An anamorphic lens having a focal length that is shorter in a first direction perpendicular to an optical axis thereof than in a second direction perpendicular to the first direction and the optical axis, the lens consisting of from an object side:

a first negative lens which is made of glass and has spherical surfaces;

a second negative lens having at least one non-rotationally symmetric aspherical surface;

a third positive lens; and a fourth positive lens, wherein either the third lens or the fourth lens includes at least one non-rotationally symmetric aspherical surface.

2. The anamorphic lens of claim 1, wherein one of surfaces which are of the third lens and the fourth lens and are not a non-rotationally symmetric aspherical surface includes a rotationally symmetric aspherical surface.

3. The anamorphic lens of claim 1, wherein the following relationship is satisfied:

$$-0.80 < fx12/fx34 < -0.35$$

wherein:

fx12 is a combined focal length, of the first lens and the second lens, in the first direction; and fx34 is a combined focal length, of the third lens and the fourth lens, in the first direction.

4. The anamorphic lens of claim 1, wherein the following relationship is satisfied:

$$90° \leq 2\omega y \leq 135°$$

wherein:

2ωy is an angle of view in the second direction.

5. An anamorphic lens which is used for forming an image of an object on a rectangular imaging surface of an image pickup device, and having a focal length that is shorter in a horizontal direction which is a direction of a long side of the rectangular imaging surface than in a vertical direction which is a direction of a short side of the rectangular imaging surface, the anamorphic lens consisting of from an object side:

a first negative lens which is made of glass and has spherical surfaces;

a second negative lens having at least one non-rotationally symmetric aspherical surface;

a third positive lens; and a fourth positive lens, wherein either the third lens or the fourth lens includes at least one non-rotationally symmetric aspherical surface.

6. The anamorphic lens of claim 5, wherein one of surfaces which are of the third lens and the fourth lens and are not non-rotationally symmetric aspherical includes a rotationally symmetric aspherical surface.

7. The anamorphic lens of claim 5, wherein the following relationship is satisfied:

$$-0.80 < fx12/fx34 < -035$$

wherein:

fx12 is a combined focal length, of the first lens and the second lens, in the horizontal direction; and fx34 is a combined focal length, of the third lens and the fourth lens, in the horizontal direction.

8. The anamorphic lens of claim 5, wherein the following relationship is satisfied:

$$90° \leq 2\omega y \leq 135°$$

wherein:

2ωy is an angle of view in the vertical direction.

* * * * *